United States Patent
Pyka et al.

(10) Patent No.: US 9,960,913 B2
(45) Date of Patent: May 1, 2018

(54) METHOD AND ARRANGEMENT FOR SECURE COMMUNICATION BETWEEN NETWORK UNITS IN A COMMUNICATION NETWORK

(71) Applicant: SIEMENS AKTIENGESELLSCHAFT, München (DE)

(72) Inventors: Stefan Pyka, Markt Schwaben (DE); Johannes Zwanzger, Neubiberg (DE)

(73) Assignee: Siemens Aktiengesellschaft, München (DE)

( * ) Notice: Subject to any disclaimer, the term of this patent is extended or adjusted under 35 U.S.C. 154(b) by 20 days.

(21) Appl. No.: 14/443,383

(22) PCT Filed: Sep. 16, 2013

(86) PCT No.: PCT/EP2013/069090
§ 371 (c)(1),
(2) Date: May 16, 2015

(87) PCT Pub. No.: WO2014/075830
PCT Pub. Date: May 22, 2014

(65) Prior Publication Data
US 2015/0334096 A1     Nov. 19, 2015

(30) Foreign Application Priority Data
Nov. 16, 2012   (DE) .................. 10 2012 220 990

(51) Int. Cl.
*H04L 9/00*       (2006.01)
*H04L 9/08*       (2006.01)
*H04L 29/06*      (2006.01)

(52) U.S. Cl.
CPC .......... *H04L 9/0838* (2013.01); *H04L 9/0877* (2013.01); *H04L 63/061* (2013.01); *H04L 63/068* (2013.01); *H04L 2209/16* (2013.01)

(58) Field of Classification Search
CPC . H04L 2209/16; H04L 63/068; H04L 9/0838; H04L 9/0877; H04L 63/061
See application file for complete search history.

(56) References Cited

U.S. PATENT DOCUMENTS 7,263,357 B2 *  8/2007  Lee ................. H04L 63/062
                                              455/410
7,757,087 B2 *  7/2010  Isozaki ................ G06F 21/10
                                              380/232

(Continued)

FOREIGN PATENT DOCUMENTS

CN   1761317 B    9/2010
EP   1648112 A1   4/2006
WO   WO9724831 A1 7/1997

OTHER PUBLICATIONS

"Secure Cryptoprocessor"; Wikipedia; XP055089636; Feb. 12, 2012: http://en.wikipedia.org/wiki/Secure_cryptoprocessor.

(Continued)

*Primary Examiner* — Sharon Lynch
(74) *Attorney, Agent, or Firm* — Lempia Summerfield Katz LLC

(57) ABSTRACT

The invention relates to a first network unit (See) which comprises a secure hardware component (HK) for saving and running software. A second network unit (P) comprises a secure software component (SK) for saving and running software. A method for secure communication comprises: saving a first common secret, a first algorithm and a second algorithm on the network units; sending a first date from the second network unit to the first network unit; running the first algorithm on the first network unit and on the second (Continued)

network unit wherein the input is in each case formed by the second common secret and the first date; sending of a second date from the first network unit to the second network unit; running the second algorithm on the first network unit and on the second network unit; wherein the input is formed in each case by the second common secret and the second date; and use of the third common secret for a secure communication.

14 Claims, 1 Drawing Sheet

(56) References Cited

U.S. PATENT DOCUMENTS

| | | | | |
|---|---|---|---|---|
| 7,787,627 B2* | 8/2010 | Sood | ............... | H04L 9/0836 380/270 |
| 8,225,106 B2* | 7/2012 | Mattsson | ............ | G06F 21/6218 380/277 |
| 8,769,272 B2* | 7/2014 | Mattsson | ............ | G06F 21/6218 713/165 |
| 2002/0048372 A1* | 4/2002 | Toh | ............... | G06F 21/64 380/285 |
| 2004/0039924 A1* | 2/2004 | Baldwin | ............... | G06F 21/53 713/189 |
| 2004/0101141 A1* | 5/2004 | Alve | ............... | G06F 21/602 380/278 |
| 2004/0242228 A1* | 12/2004 | Lee | ............... | H04L 63/062 455/432.1 |
| 2005/0182934 A1* | 8/2005 | Elteto | ............... | H04L 9/0825 713/169 |
| 2006/0085644 A1* | 4/2006 | Isozaki | ............... | G06F 21/10 713/171 |
| 2007/0121947 A1* | 5/2007 | Sood | ............... | H04L 9/0836 380/277 |
| 2007/0189249 A1* | 8/2007 | Gurevich | ............... | H04L 45/20 370/338 |
| 2008/0226065 A1* | 9/2008 | Zunke | ............... | H04L 9/0822 380/30 |
| 2010/0325443 A1* | 12/2010 | Mattsson | ............ | G06F 21/6218 713/189 |
| 2011/0029774 A1* | 2/2011 | Zunke | ............... | H04L 9/0822 713/168 |
| 2012/0266218 A1* | 10/2012 | Mattsson | ............ | G06F 21/6218 726/4 |
| 2013/0019105 A1* | 1/2013 | Hussain | ............... | G06F 21/10 713/189 |
| 2014/0006803 A1* | 1/2014 | Bodis | ............... | G06F 21/602 713/189 |
| 2014/0344585 A1* | 11/2014 | Hussain | ............... | G06F 21/10 713/191 |

OTHER PUBLICATIONS

Chinese Office Action for Chinese Patent Application No. 201380059755.2 dated Apr. 5, 2017.
German Office Action for German Application No. 102012220990.5, dated Jul. 8, 2013, with English translation.
PCT International Search Report for corresponding PCT/EP2013/069090, dated Sep. 16, 2013, with English translation.
Wikipedia; "IEEE 802.11i-2004"; XP055089706; May 7, 2012.
Wyseur, Brecht. "White-box cryptography: hiding keys in software." NAGRA Kudelski Group (2012).

* cited by examiner

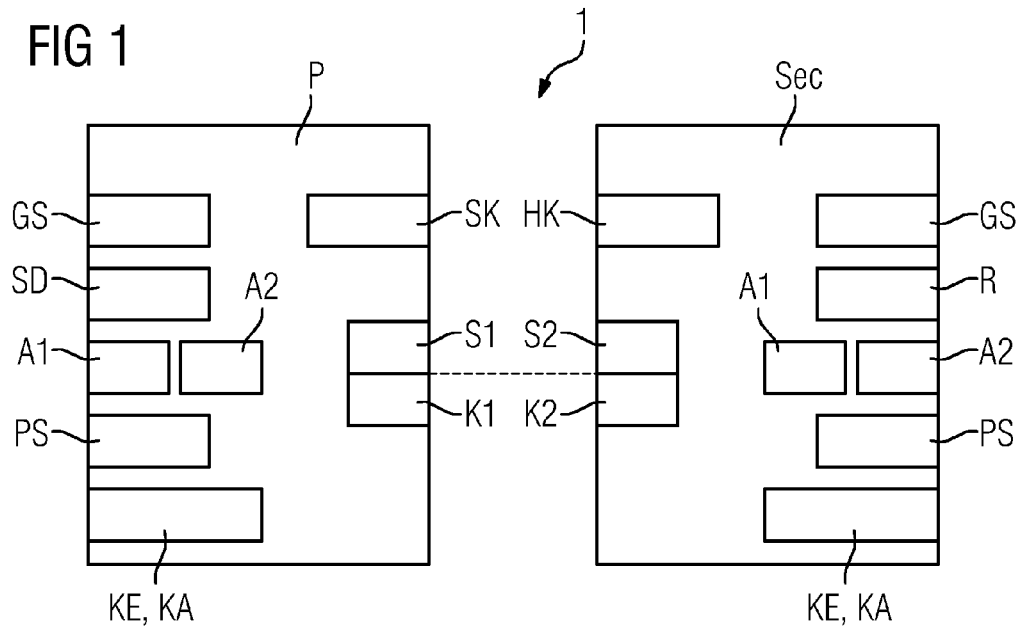
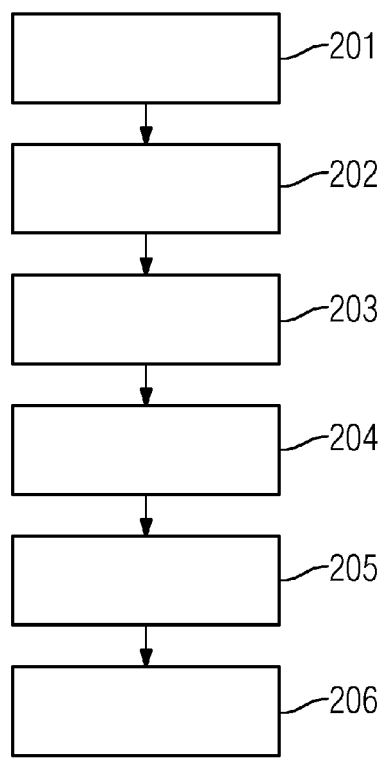

METHOD AND ARRANGEMENT FOR SECURE COMMUNICATION BETWEEN NETWORK UNITS IN A COMMUNICATION NETWORK

This application is the National Stage of International Application No. PCT/EP2013/069090, filed Sep. 16, 2013, which claims the benefit of German Patent Application No. 10 2012 990.5, filed Nov. 16, 2012. The entire contents of these documents are hereby incorporated herein by reference.

The present embodiments relate to secure communication between network units in a communication network.

It is often desirable to protect software that is to be run on an insecure network unit, such as, for example, an insecure hardware platform, against external attacks. An insecure hardware platform, such as, for example, a universal computer consisting of standard components, has no countermeasures against external attacks of this type on software running on the platform. External attacks aim, for example, to obtain information on the running software or to manipulate the software.

There are different approaches to implementing measures on an insecure hardware platform that meet specific security requirements for the running software.

If the relevant hardware platform cannot be extended or modified, all measures to protect the software are to be achieved by extending the existing software. Known ways are, for example, the technique of obfuscation or white-box cryptography, which enable the mode of operation and data content of software running on the hardware platform to be concealed from an attacker. However, these techniques are fraught with the risk that the mode of operation may nevertheless be analyzed and cracked by an attacker.

If the hardware platform may be extended or modified, the use of suitable secure network units, such as, for example, secure modules, is appropriate.

Secure modules are, for example, secure memory modules, trusted platform modules (TPMs), or SmartCard controllers (e.g., security controllers). Using modules of this type, it is possible, for example, to store secret data material securely and in non-readable form, and to implement cryptographic algorithms securely, for example, resistant to side-channel attacks.

However, the use of secure hardware modules brings with it the disadvantage that further problems may arise due to additionally necessary communication between the insecure platform and the secure hardware modules. For example, an attacker may monitor the communication interface between the insecure platform and a secure module and analyze the respective data traffic.

A confidential and authentic communication between an insecure hardware platform and a secure module has therefore hitherto been difficult to provide.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved secure communication between network units is provided.

A method is proposed for secure communication between a first network unit and a second network unit in a communication network. The first network unit includes at least one secure hardware component for the secure storage and secure running of software. The second network unit includes at least one secure software component for the secure storage and secure running of software. The method has the following acts:

a) storage of a first common secret, a first algorithm and a second algorithm on the first network unit using the secure hardware component and on the second network unit using the secure software component;
b) transmission of a first datum from the second network unit to the first network unit;
c) running of the first algorithm on the first network unit using the secure hardware component and on the second network unit using the secure software component for the respective provision of a second common secret, where an input for the first algorithm is formed in each case by the first common secret and the first datum;
d) transmission of a second datum from the first network unit to the second network unit;
e) running of the second algorithm on the first network unit using the secure hardware component and on the second network unit using the secure software component for the respective provision of a third common secret, where an input for the second algorithm is formed in each case by the second common secret and the second datum; and
f) use of the third common secret by the first network unit and the second network unit for a secure communication between the first network unit and the second network unit.

The term "software" includes executable programs and the associated data and forms the complement to the term "hardware", which includes the physical components of a network unit.

The first datum and the second datum may in each case be transmitted in clear text (e.g., without encryption).

The method allows a secure and authentic communication between two network units such as, for example, an insecure hardware platform and a secure module. The common secrets that are used for each pair of first and second network units may be formed differently so that a potential attacker may not transfer the results of an analysis relating to an insecure network device onto a different insecure network device.

The method enables the communication channel between an insecure platform and a security controller to be protected in a flexible manner against attacks on confidentiality and authenticity. This is achieved with minimal outlay and minimal costs.

In embodiments of the method, a repetition of acts d) and e) is carried out for an update of the third common secret according to a predefinable rule.

In this way, the third common secret may, for example, be changed at regular intervals in order to hinder a potential attack on a communication channel between the first and second network units.

The second datum is advantageously changed for each repetition of acts d) and e).

In further embodiments, the first network unit refuses a further communication with the second network unit if the updating of the third common secret due according to the predefinable rule does not take place.

This represents a further improvement in the secure communication between the network units, since, in the case of a successful attack, a possibly corrupted third common secret is no longer usable for an attacker due to the updating that is to be provided for a further communication.

In further embodiments, the predefinable rule includes a trigger, where the trigger is activated by the expiry of a predefinable time period.

In further embodiments, the predefinable rule includes a trigger, where the trigger is activated by a reaching of a predefinable data volume exchanged between the first network unit and the second network unit.

In further embodiments, the predefinable rule includes a trigger, where the trigger is activated after each use of the third common secret by the first network unit or the second network unit.

The updating of the third common secret after each use is, for example, advantageous in the case of semantically very simple data to be transmitted, which may assume only a small number of different values (e.g., "0/1" or "Yes/No"). Data of this type may easily be derived by an attacker if the same third common secret is used over a lengthy period for the secure communication.

If the third common secret is changed regularly, an attacker may analyze the communication for a short time period only, and may use the results at most until the third common secret is changed.

In further embodiments, the first datum and/or the second datum is a random number, a platform-individual datum, or a serial number.

The use of a platform-individual datum or serial number enables a platform-individual communication that hinders a potential attacker from drawing conclusions relating to other platforms from the analysis of the communication of one platform.

In further embodiments, the first common secret and/or the second common secret and/or the third common secret are formed by two communication keys, where the two communication keys include a confidentiality key and an authenticity key.

In further embodiments, the second network unit is a universal computer.

A universal computer is, for example, a calculator or computer that is formed from standard components that do not need to be secured.

In further embodiments, the secure hardware component is formed by a security module protected against unauthorized access.

A security module is, for example, a trusted platform module. Security modules of this type are commercially available in large numbers.

In further embodiments, the secure software component is formed by code obfuscation, white-box cryptography, and/or measures to protect against debugging attacks.

A protection against debugging attacks serves to protect against attacks on the software and/or the associated data in runtime by debuggers. Debuggers are software tools that enable access to running programs and corresponding data in the memory of a computer.

In further embodiments, the first network unit is configured as a security controller (e.g., SmartCard controller).

In further embodiments, the security controller is configured as a passive component.

The term "passive" provides that the security controller responds only to requests from the insecure platform and may send the second datum for a key update.

A computer program product that initiates the performance of at least one act of the method described above on a program-controlled unit is provided.

A computer program product may be provided or supplied, for example, as a storage medium (e.g., a non-transitory computer-readable storage medium), such as a memory card, a USB stick, a CD-ROM, a DVD or in the form of a downloadable file from a server in a network. This may be effected, for example, in a wireless communication network through the transmission of a corresponding file with the computer program product.

A data medium (e.g., a non-transitory computer-readable storage medium) with a stored computer program with commands that initiates the performance of at least one act of a corresponding method on a program-controlled unit is also provided.

An arrangement with a first network unit and a second network unit in a communication network is provided. The first network unit includes at least one secure hardware component for the secure storage and secure running of software, and the second network unit includes at least one secure software component for the secure storage and secure running of software. The secure hardware component is configured for the secure storage of a first common secret, a first algorithm, and a second algorithm on the first network unit. The secure software component is configured for the secure storage of the first common secret, the first algorithm, and the second algorithm on the second network unit. The arrangement also has a first transmitter that is configured for the transmission of a first datum from the second network unit to the first network unit. The secure hardware component is configured for the secure running of the first algorithm on the first network unit. The secure software component is configured for the secure running of the first algorithm on the second network unit. Both serve for the respective provision of a second common secret, where the input for the first algorithm is formed in each case by the first common secret and the first datum. The arrangement also has a second transmitter that is configured for the transmission of a second datum from the first network unit to the second network unit. The secure hardware component is configured for the secure running of the second algorithm on the first network unit. The secure software component is configured for the secure running of the second algorithm on the second network unit. Both serve for the respective provision of a third common secret, where the input for the second algorithm is formed in each case by the second common secret and the second datum. The arrangement has communication devices that are configured for the use of the third common secret by the first network unit and the second network unit for a secure communication between the first network unit and the second network unit.

The cryptographic device, the first transmitter and the second transmitter, and the communication device may be implemented via hardware and/or software. In the case of a hardware implementation, the respective devices may be configured as a device or as part of a device (e.g., as a computer or as a microprocessor). In the case of a software implementation, the respective device may be configured as a computer program product, as a function, as a routine, as part of a program code or as an executable object.

Further possible implementations of the present embodiments also include combinations, not explicitly specified, of method acts, features, or embodiments of the method or the arrangement described above or below in relation to the example embodiments. The person skilled in the art will also add or modify individual aspects as improvements or supplements to the respective basic form of the invention.

BRIEF DESCRIPTION OF THE DRAWINGS

FIG. 1 shows a schematic view of an example embodiment of an arrangement with a first network unit and a second network unit in a communication network; and FIG. 2 shows a schematic flow diagram of an example embodiment of a method for secure communication between a first network unit and a second network unit in a communication network.

In the figures, same or functionally same elements are denoted with the same reference numbers, unless otherwise indicated.

DETAILED DESCRIPTION

FIG. 1 shows a schematic view of a first example embodiment of an arrangement 1 with a first network unit Sec and a second network unit P in a communication network. A communication connection, which is shown in FIG. 1 by a dotted line, exists between the first network unit Sec and the second network unit P. Further components of the communication network are not shown in FIG. 1. for the sake of better readability.

The second network unit P is a universal computer including standard components and is therefore an unprotected or insecure platform, whereas the first network unit Sec is a security controller (e.g., a protected or secure platform).

The security controller Sec includes a secure hardware component HK for the secure storage and secure running of software, and the insecure platform P includes a secure software component SK for the secure storage and secure running of software. Due to the secure software component SK, software (e.g., a program and corresponding data) is protected in adequate form on the insecure platform against debugging attacks. As a result of this, a fast readout of the communication keys GS, PS and KE, KA that are then used is not possible for an external attacker on the insecure platform.

The secure hardware component HK is configured for the secure storage of a first common secret GS and for the secure running of a first algorithm A1 and a second algorithm A2 on the security controller Sec. The secure software component SK is configured for the secure storage of the first common secret GS and for the secure running of the first algorithm A1 and the second algorithm A2 on the insecure platform P.

Both the security controller Sec and the insecure platform P thus include corresponding devices for the secure storage of the first common secret GS and for the secure running of the first algorithm A1 and the second algorithm A2. This serves for the respective provision of a second common secret PS.

The insecure platform P also includes a first transmit device S1 for the transmission of a first datum SD (e.g., a serial number stored on the insecure platform P or a hardware address) to the security controller Sec.

The security controller P includes a second transmit device S2 for the transmission of a second datum R (e.g., a random number) to the insecure platform P.

The secure hardware component HK and the secure software component SK are configured for the secure running of the second algorithm A2. This serves for the respective provision of a third common secret KE, KA.

Both the security controller Sec and the insecure platform P include a communication device K1, K2 for the use of the third common secret KE, KA for a secure communication with one another.

FIG. 2 shows a schematic flow diagram of an example embodiment of a method for secure communication between the security controller Sec and the insecure platform P.

In act 201, the first common secret GS, the first algorithm A1 and the second algorithm A2 are stored on the security controller using the secure hardware component HK and on the insecure platform P using the secure software component SK.

A common secret GS, which may, for example, be a cryptographic key in the form of two communication keys KE, KA, is thus stored on the insecure platform P and on the security controller Sec. This common secret GS is identical for all platforms. This secret GS may not be read out on the security controller Sec, since the security controller Sec includes, for example, a secure, non-readable memory. The common secret GS is protected on the insecure platform P in a suitable way (e.g., using code obfuscation or through white-box cryptography; through the integration of the secret GS into a cryptographic algorithm that is implemented by white-box techniques).

In act 202, the serial number SD is transmitted from the insecure platform P to the security controller Sec.

The act 202 is also referred to as initial pairing.

In act 203, the first algorithm A1 is run on the security controller Sec using the secure hardware component HK and on the insecure platform P using the secure software component SK for the respective provision of the second common secret PS, where an input for the first algorithm A1 is formed in each case by the first common secret GS and the serial number SD.

A platform-individual secret PS is therefore derived in each case with the same algorithm A1 using the platform-individual serial number SD on both the insecure platform P and the security controller Sec. The datum SD (e.g., the serial number) may be transmitted in clear text to the security controller Sec. The algorithm A1 is to be protected on the insecure platform P (e.g., through obfuscation or white-box cryptography).

The security controller Sec uses a key update of the communication keys KE, KA at regular intervals. For this purpose, in act 204, the random number R is transmitted from the security controller Sec to the insecure platform P.

In act 205, the second algorithm A2 is run on the security controller Sec using the secure hardware component HK and on the insecure platform P using the secure software component SK for the respective provision of the third common secret KE, KA, where an input for the second algorithm A2 is formed in each case by the second common secret PS and the second datum R.

In this way, new communication keys KE, KA including a confidentiality key KE and an authenticity key KA are calculated from the random number R and the platform-individual key PS. The random number R may again be transmitted in clear text to the insecure platform P. The algorithm A2 is again to be protected on the insecure platform P through code obfuscation or white-box cryptography.

The act 204 and the act 205 represent a secret update or key update of the communication keys. The secret update may be carried out at regular intervals in order to hinder an attack by an external attacker.

The insecure platform P is intended to be forced to carry out a key update at regular intervals. This process may not be instigated by the security controller Sec if a purely passive module is involved. Rules that unambiguously clarify for both sides (e.g., for the security controller Sec and the insecure platform P) are therefore defined when a key update of this type is to be carried out. This may be the case, for example, once a specific data volume transmitted between the security controller Sec and the insecure platform P has been attained or at the end of a pre-definable time period.

In the absence of a key update due according to a rule, the security controller Sec refuses any further communication with the insecure platform P.

In act 206, the third common secret KE, KA is used by the security controller Sec and the insecure platform P for a secure communication with one another. The act 206 includes any number of communication processes between the security controller Sec and the insecure platform P, where, as explained above, a key update according to acts 204 and 205 is undertaken at regular intervals in order to further increase the security of the method.

Act 202 is used in order to enable a platform-individual communication. This measure hinders attackers from drawing conclusions relating to other platforms from the analysis of the communication of one platform.

Acts 204 and 205 (e.g., the regular key update) are used in order to hinder the analysis of the communication by an attacker. Since the communication keys are regularly changed, an attacker may analyze the communication for a short time period only and may use the results at most until the keys are changed.

Act 202 may not be replaced by the transmission of a random number R2 from the security controller Sec to the insecure platform P. It would then be possible for an attacker to observe this random number on a platform and load the random number onto further platforms (e.g., insecure platforms) during the pairing process. The security controller Sec from which the random number R2 was transmitted may then be used as a server for different insecure platforms, since all platforms would then know the same platform-individual key PS.

An example of the selection of the algorithms A1 and A2 is shown below.

The common secret GS and the common secret PS are stored on the insecure platform P by a symmetric block cipher E protected through white-box cryptography. The symmetric block cipher protected through white-box cryptography thus represents the secure software component SK on the insecure platform P.

The individual acts for the algorithms A1 and A2, including the key deposition or key storage on the insecure platform P and the security controller Sec are as follows:
1. GS is to be protected in a suitable manner by an irreversible transformation T. GS is therefore stored on the insecure platform P in the form of T(GS).
2. The symmetric block cipher E inverts the transformation T, for example, through white-box implementation, on the key GS, after which the actual key derivation takes place. The result is again stored following a transformation with T. PS is derived by $PS=E(T^{-1}(GS), SD)$. T (PS) is stored on the insecure platform P.3. In order to generate the communication keys KA and KE, the security controller Sec generates two random numbers R1 and R2. These are again encrypted using the symmetric algorithm A2, and the cipher texts are used as the two communication keys KE, KA.

KE is derived by $KE=E(T^{-1}(PS), R1)$.
KA is derived by $KE=E(T^{-1}(PS), R2)$.

An attacker may not then successfully attack the common secret GS, since the common secret GS is protected on the insecure platform P by the transformation T and on the security controller Sec by the secure memory.

An attacker may not successfully attack the algorithm A1, since the algorithm A1 is protected by the white-box methods on the insecure platform P and by the secure memory on the security controller Sec.

An attacker may not successfully attack the common secret PS either, since the common secret PS is protected on the insecure platform P by the transformation T and on the security controller Sec by the secure memory.

An attacker may not successfully attack the algorithm A2 either, since the algorithm A2 is protected by the white-box methods on the insecure platform P and by the secure memory on the security controller Sec.

An attacker may not successfully attack the communication keys KE and KA since the communication keys KE and KA, as described above, are transient due to the regular key update, and the insecure platform P is adequately protected with anti-debugging measures in order to prevent a fast extraction of the communication keys KE, KA from the memory of the insecure platform P. The communication keys KE, KA are protected on the security controller Sec by the secure memory.

Although the invention has been illustrated and described in detail by the example embodiments, the invention is not limited by the disclosed examples. Other variations may be derived herefrom by the person skilled in the art without exceeding the protective scope of the invention.

The elements and features recited in the appended claims may be combined in different ways to produce new claims that likewise fall within the scope of the present invention. This, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for secure communication between a first network unit and a second network unit in a communication network, the method comprising:
storing a first common secret, a first algorithm, and a second algorithm on the first network unit using at least one secure hardware component, wherein the first network unit comprises the at least one secure hardware component for secure storage and secure running of software, and on the second network unit using at least one secure software component formed by code of obfuscation, white-box cryptography, measures to protect against debugging attacks, or any combination thereof, wherein the second network unit comprises an insecure hardware platform and using the at least one secure software component for secure storage and secure running of software and the first algorithm is distinct from the second algorithm;
transmitting a first datum from the second network unit to the first network unit;
running the first algorithm on the first network unit using the at least one secure hardware component and on the second network unit using the at least one secure software component for respective provision of a second common secret, wherein an input for the respective first algorithm is formed the first common secret and the first datum;

transmitting a second distinct datum from the first network unit to the second network unit;

running the second algorithm on the first network unit using the at least one secure hardware component and on the second network unit using the at least one secure software component for respective provision of a third common secret, wherein an input for the respective second algorithm is formed the second common secret and the second datum, wherein the transmitting of the second datum and the running of the second algorithm are repeated for an update of the third common secret according to a predefine rule comprising a trigger activated after each use of the third common secret by the first network unit or the second network unit;

and using the third common secret by the first network unit and the second network unit, such that a secure communication between the at least one secure hardware component of the first network unit and the insecure hardware platform of the second network unit is provided.

2. The method of claim 1, wherein the first network unit refuses a further communication with the second network unit when the updating of the third common secret due according to the predefinable rule does not take place.

3. The method of claim 1, wherein the predefinable rule comprises a trigger, and wherein the trigger is activated by expiration of a predefinable time period.

4. The method of claim 1, wherein the predefinable rule comprises a trigger, and wherein the trigger is activated by a reaching of a predefinable data volume exchanged between the first network unit and the second network unit.

5. The method of claim 1, wherein the first datum, the second datum, or the first datum and the second datum are a random number, a platform-individual datum, or a serial number.

6. The method of claim 1, wherein the first common secret, the second common secret, the third common secret, or any combination thereof is formed by two communication keys, and
    wherein the two communication keys comprise a confidentiality key and an authenticity key.

7. The method of claim 1, wherein the second network unit is a universal computer.

8. The method of claim 1, wherein the at least one secure hardware component is formed by a security module protected against unauthorized access.

9. The method of claim 1, wherein the first network unit is configured as a security controller.

10. The method of claim 9, wherein the security controller is configured as a passive component.

11. In a non-transitory computer-readable storage medium storing instructions executable by a processor for secure communication between a first network unit and a second network unit in a communication network, the instructions comprising:

storing a first common secret, a first algorithm, and a second algorithm on the first network unit using the at least one secure hardware component, wherein the first network unit comprises the at least one secure hardware component for secure storage and secure running of software, and on the second network unit using the at least one secure software component formed by code obfuscation, white-box cryptography, measures to protect against debugging attacks, or any combination thereof, wherein the second network unit comprises an insecure hardware platform and using the least one secure software component for secure storage and secure running of software and the first algorithm is distinct from the second algorithm;

transmitting a first datum from the second network unit to the first network unit;

running the first algorithm on the first network unit using the at least one secure hardware component and on the second network unit using the at least one secure software component for respective provision of a second common secret, wherein an input for the respective first algorithm is formed by the first common secret and the first datum;

transmitting a second distinct datum from the first network unit to the second network unit;

running the second algorithm on the first network unit using the at least one secure hardware component and on the second network unit using the at least one secure software component for respective provision of a third common secret, wherein an input for the respective second algorithm is formed by the second common secret and the second datum, wherein the transmitting of the second datum and the running of the second algorithm are repeated for an update of the third common secret according to a predefinable rule comprising a trigger activated after each use of the third common secret by the first network unit or the second network unit; and using the third common secret by the first network unit and the second network unit, such that a secure communication between the at least one secure hardware component of the first network unit and the insecure hardware platform of the second network unit is provided.

12. The non-transitory computer-readable storage medium of claim 11, wherein the first network unit refuses a further communication with the second network unit when the updating of the third common secret due according to the predefinable rule does not take place.

13. The non-transitory computer-readable storage medium of claim 11, wherein the predefinable rule comprises a trigger, and wherein the trigger is activated by expiration of a predefinable time period.

14. An arrangement comprising:
    a first network unit; and
    a second network unit in a communication network, wherein the first network unit comprises at least one secure hardware component for secure storage and secure running of software, wherein the second network unit comprises an insecure hardware platform and at least one secure software component formed by code obfuscation, white-box cryptography, measures to protect against debugging attacks, or any combination thereof,
    wherein the at least one secure hardware component is configured for secure storage of a first common secret, a first algorithm, and a second algorithm on the first network unit, and the at least one secure software component is configured for secure storage of the first common secret, the first algorithm, and the second algorithm on the second network unit, wherein the first algorithm is distinct from the second algorithm, wherein a first transmitter is configured for transmission of a first datum from the second network unit to the first network unit, the second network unit comprising the first transmitter, wherein the at least one secure hardware component is configured for secure running of the first algorithm on the first network unit, and the at least one secure software component is configured for secure running of the first algorithm on the second network unit for respective provision of a second common secret, and wherein an input for the respective first algorithm is formed by the first common secret and the first datum, wherein a second transmitter is configured for the transmission of a second distinct datum from the first network unit to the second network unit, the first network unit comprising the second transmitter, wherein the at least one secure hardware component is configured for secure running of the second algorithm on the first network unit, and the at least one secure software component is configured for secure running of the second algorithm on the second network unit for respective provision of a third common secret, wherein an input for the respective second algorithm is formed by the second common secret and the second datum, wherein the transmitting of the second datum and the running of the second algorithm are repeated for an update of the third common secret according to a predefinable rule comprising a trigger activated after each use of the third common secret by the first network unit or the second network unit, and wherein the first network unit and the second network unit comprise communication devices configured for use of the third common secret by the first network unit and the second network unit, such that a secure communication between the at least one secure hardware component of the first network unit and the insecure hardware platform of the second network unit is provided.

* * * * *